(12) United States Patent
Chludek

(10) Patent No.: US 12,264,729 B2
(45) Date of Patent: Apr. 1, 2025

(54) LOCKABLE DIFFERENTIAL TRANSMISSION

(71) Applicant: GKN Automotive Ltd., Birmingham (GB)

(72) Inventor: Adrian Chludek, St. Augustin (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/568,868

(22) PCT Filed: Jun. 14, 2021

(86) PCT No.: PCT/EP2021/065912
§ 371 (c)(1),
(2) Date: Dec. 11, 2023

(87) PCT Pub. No.: WO2022/262931
PCT Pub. Date: Dec. 22, 2022

(65) Prior Publication Data
US 2024/0280167 A1   Aug. 22, 2024

(51) Int. Cl.
*F16H 48/22* (2006.01)
*F16H 48/08* (2006.01)
*F16H 57/04* (2010.01)

(52) U.S. Cl.
CPC ............. *F16H 48/08* (2013.01); *F16H 48/22* (2013.01); *F16H 2048/082* (2013.01); *F16H 57/0473* (2013.01)

(58) Field of Classification Search
CPC .......................... F16H 48/08–2048/087; F16H 48/20–2048/346; F16H 48/38–48/40
(Continued)

(56) References Cited

U.S. PATENT DOCUMENTS 2,443,590 A * 6/1948 Alden .................. F16H 3/64
475/346
3,052,137 A * 9/1962 Russell .............. F16H 48/22
475/234
(Continued)

FOREIGN PATENT DOCUMENTS

DE          6606330 U      9/1970
DE         19709523 C1     4/1998
(Continued)

OTHER PUBLICATIONS

International Search Report and Written Opinion for PCT/EP2021/065912 mailed Feb. 3, 2022 (14 pages; with English translation).
(Continued)

*Primary Examiner* — Sherry L Estremsky
(74) *Attorney, Agent, or Firm* — Reising Ethington P.C.

(57) ABSTRACT

A differential gear for transmitting a torque to an axle of a motor vehicle including a differential basket, a bevel gear, first and second output shafts, and a multi-plate clutch. The bevel gear includes inner and outer circumferential surfaces. The bevel gear is supported by a contact surface of the differential basket with respect to a radial direction. The output shafts have a common rotary axis, the first output shaft forming a positive connection with the bevel gear with respect to a circumferential direction via a outer circumferential surface of the first output shaft and the inner circumferential surface of the bevel gear. The multi-plate clutch provides for selectively connecting the first output shaft with the differential basket and includes an inner plate carried by a section of the outer circumferential surface of the bevel gear and an outer plate carried by the differential basket.

18 Claims, 3 Drawing Sheets

(58) Field of Classification Search
USPC .......................................................... 475/231
See application file for complete search history.

(56) References Cited

U.S. PATENT DOCUMENTS

| | | | | |
|---|---|---|---|---|
| 3,313,180 A | * | 4/1967 | Balfour | F16H 48/22 |
| | | | | 475/241 |
| 3,362,258 A | | 1/1968 | Thornton | |
| 3,490,312 A | * | 1/1970 | Dehart | F16H 48/08 |
| | | | | 192/85.02 |
| 3,906,812 A | * | 9/1975 | Kagata | F16H 48/22 |
| | | | | 475/235 |
| 3,974,717 A | * | 8/1976 | Breed | F16H 48/34 |
| | | | | 475/233 |
| 5,098,360 A | | 3/1992 | Hirota | |
| 5,749,801 A | * | 5/1998 | Teraoka | F16H 48/32 |
| | | | | 475/88 |
| 6,001,040 A | * | 12/1999 | Engle | F16H 48/27 |
| | | | | 475/86 |
| 6,290,623 B1 | * | 9/2001 | Morse | F16H 48/34 |
| | | | | 475/238 |
| 6,296,590 B1 | * | 10/2001 | Gassmann | B60K 23/0808 |
| | | | | 180/247 |
| 7,104,912 B2 | * | 9/2006 | Morgensai | F16D 3/06 |
| | | | | 475/88 |
| 7,201,692 B2 | | 4/2007 | Morgensai | |
| 7,775,926 B2 | | 8/2010 | Sugaya et al. | |
| 11,879,533 B2 | * | 1/2024 | Hirota | F16H 48/22 |
| 2008/0254931 A1 | | 10/2008 | Sugaya et al. | |
| 2020/0292045 A1 | | 9/2020 | Fukuda | |

FOREIGN PATENT DOCUMENTS

| | | |
|---|---|---|
| EP | 0414086 A2 | 2/1991 |
| JP | S63127883 U | 8/1988 |
| JP | 2006077985 A | 3/2006 |
| JP | 2008281194 A | 11/2008 |
| JP | 2013072473 A | 4/2013 |

OTHER PUBLICATIONS

JP Office Action for JP Application No. 2023-577204 dated Jan. 7, 2025, (11 pages).

* cited by examiner

LOCKABLE DIFFERENTIAL TRANSMISSION

CROSS-REFERENCE TO RELATED APPLICATIONS

This application is a national stage of, and claims priority to, Patent Cooperation Treaty Application No. PCT/EP2021/065912, filed on Jun. 14, 2021, which application is hereby incorporated herein by reference in its entirety.

BACKGROUND

In a conventional differential gear, a torque is usually transmitted from a drive unit via an input shaft (e.g., via a longitudinal shaft) to two output shafts. Within the differential gear, the torque introduced is transmitted from a differential basket to gear wheels which are rotatably arranged in the differential basket and connected to each other via gear teeth. The gear wheels are connected to the output shafts. At least one output shaft can be connected to the differential basket via a clutch. On the one hand, the differential gear can be used to compensate for different speeds of the wheels connected to the output shafts. On the other hand, the clutch can be used to distribute the torque, possibly differently, to the wheels.

When the clutch is not actuated, both wheels are driven via the differential gear with the same amount of torque, even if they rotate at different speeds—as in the case of a drive around a curve. When turning at the same speed, the wheels connected to the output shafts of the differential gear cause no loss of power and no wear, as they do not move relative to each other. If one of the wheels stops completely and the clutch is not actuated, the other wheel will turn twice as fast as the differential basket. This can occur, for example, when starting off, namely when one of the two wheels loses static friction with the ground, for example on mud, snow, and the like. This wheel then "spins" and both wheels no longer transmit forward-driving torque. Even when cornering at high speed, the inside wheel can be unloaded to the extent that it spins.

A lockable differential gear can prevent both wheels no longer transmitting forward-driving torque. This can be prevented by rigidly connecting the two output shafts (full lock) or reduced by friction set via the clutch. In the latter case, part of the power is transferred to the driving wheel and the rest is converted into heat in the differential gear or clutch. When the lock is engaged (full lock), the wheels turn at the same speed and the torque is distributed between the wheels according to the grip. If the full lock is used on the road or other "good" ground, a driveline can become distorted and damaged, as in curves where the different path lengths of the wheels can then only be absorbed by the slip of the tires.

A differential gear with shiftable clutches is known from U.S. Pat. No. 5,098,360.

A differential gear with a multi-plate clutch and a dog clutch is known from US 2020/0292045 A1. The multi-plate clutch can be actuated via an actuating device which has a ramp device. The bevel gear connected to the output shaft is designed as an inner plate carrier. The bevel gear is supported by the output shaft with respect to a radial direction.

There is a constant need to improve components of motor vehicles. In particular, the components should become lighter and more compact and at the same time as inexpensive to manufacture as possible. At the same time, a long service life of the components should be achieved even with a compact design.

SUMMARY

A lockable differential gear for transmitting a torque to an axle of a motor vehicle is disclosed herein. The differential gear comprises at least one differential basket and two output shafts (e.g., first and second output shafts) with a common rotary axis, as well as a multi-plate clutch with at least one inner plate and at least one outer plate for the switchable connection of a first output shaft with the differential basket. The first output shaft extends along the rotary axis and forms a positive connection with the bevel gear via a first outer circumferential surface of the first output shaft and an inner circumferential surface of the bevel gear, at least with respect to a circumferential direction. A section of a second outer circumferential surface of the bevel gear is designed as an inner plate carrier and the differential basket as an outer plate carrier. In other words, the multi-plate clutch includes an inner plate carried by the outer circumferential surface of the bevel gear and an outer plate carried by the differential basket. The bevel gear is supported by a contact surface of the differential basket at least with respect to a radial direction.

The differential gear herein supports the bevel gear by the differential basket. For this purpose, a contact surface is provided via which the bevel gear is supported by the differential basket at least with respect to the radial direction.

The support can be provided by a contact surface or a support element contacting the contact surface. A support element can, for example, be arranged between the bevel gear and the differential basket and enable support with respect to the radial direction. The bevel gear thus contacts the contact surface of the differential basket or the support element via a counter surface. The support element contacts the contact surface on the differential basket via a counter surface. The support element can also form an (additional) contact surface with respect to the bevel gear.

The contact via the contact surface (the contact surface provided on the differential basket and/or on the support element) provides a rotatable connection—rotatable in the circumferential direction—between the differential basket and the bevel gear (at least largely) without friction. In this way, the bevel gear can be rotated as wear-free as possible in relation to the differential basket during operation of the differential gear.

The support between the differential basket and the bevel gear is provided by contacting cylindrical surfaces which enable the rotatable connection and the support with respect to the radial direction. The cylindrical surfaces extend parallel to the rotary axis. The cylindrical surfaces are provided at least on the bevel gear and the differential basket, and possibly also on the additional support element.

The contact surface on the differential basket and/or on the support element is designed for support with respect to the radial direction during operation of the differential gear, for a surface pressure of e.g., at least 100 N/mm$^2$, or of at least 150 N/mm$^2$ (fatigue-proof).

The contact surface on the differential basket and/or on the support element and/or the counter surface on the bevel gear or on the support element contacting the respective contact surface can include, for example, a sliding coating. The support element can, for example, be a sliding ring. The contact surface and/or the respective counter surface can thus be formed, for example, by a coating having special sliding properties.

The contact surface and the counter surface on the differential basket, bevel gear and, if applicable, support element form the connection that can be rotated in relation to the circumferential direction, in relation to at least one component of the differential basket and bevel gear, in relation to both components. The bevel gear can be rotatable relative to the differential basket. In some examples, the support element can be rotated relative to the bevel gear and/or the differential basket.

The support element is arranged in a rotationally fixed manner on the differential basket via a press fit. A relative rotation of the support element in relation to the differential basket is therefore not possible. Relative rotation therefore takes place between the contact surface on the support element and the counter surface on the bevel gear.

In an alternative example, the support element is a multi-part component, e.g., a roller bearing.

The multi-plate clutch has a plurality of outer plates and a plurality of inner plates. However, the clutch can also be designed as a friction clutch with a pressure plate, a clutch disc, and a counter plate, whereby the pressure plate and counter plate are connected in a rotationally fixed manner, e.g. (as inner plates) with the bevel gear or (as outer plates) with the differential basket. The pressure plate is arranged to be displaceable along the axial direction, whereby the clutch disc is arranged between the pressure plate and the counter plate.

The multi-plate clutch can be actuated via any suitable actuating device including those conventionally known. The actuating device can be assigned to the differential gear. Via the actuating device, the plates can be displaced along the rotary axis and form an adjustable frictional connection with each other.

For example, EP 0 414 086 A2 describes an actuating device with two expanding discs that are supported by balls in relation to the axial direction. A rotation of the expanding discs relative to each other in the circumferential direction leads to a change in the position of one expanding disc in the axial direction, as the balls are arranged on ramps. The expanding discs are both arranged on the first output shaft, whereby the actuating forces are absorbed on one side by one disc secured on the first output shaft with respect to the axial direction and on the other side by the differential basket.

The output shafts each extend towards the differential basket and are positively connected to a bevel gear at least with respect to the circumferential direction. The output shafts are arranged coaxially to each other so that the differential basket and the output shafts have a common rotary axis.

The bevel gears are rotatably arranged with the output shafts in the differential basket. Within the differential basket, the output shafts or their bevel gears are coupled to each other via further gear wheels.

The first output shaft extends along the rotary axis and, via a first outer circumferential surface of the first output shaft and an inner circumferential surface of a bevel gear, forms a positive connection with the bevel gear at least with respect to a circumferential direction, e.g., via a splined connection. A section of a second outer circumferential surface of the bevel gear is designed as an inner plate carrier and the differential basket as an outer plate carrier. The at least one inner plate is positively connected with the inner plate carrier with respect to the circumferential direction.

The at least one outer plate is positively connected with the outer plate carrier with respect to the circumferential direction. Inner plates and outer plates are arranged alternately along the axial direction (which extends along the rotary axis). By displacing the plates along the axial direction, a frictional connection can be formed between the plates so that the first output shaft can be adjustably coupled to the differential basket.

The contact surface is arranged, along the rotary axis, between a plurality of bevel teeth of the bevel gear and the section of the second outer circumferential surface of the bevel gear.

The bevel gear is supported by the contact surface via a support element. In this case, the plates are supported by the differential basket via the support element with respect to an axial direction extending along the rotary axis. The contacting surfaces of the support element and of the differential basket, which provide the support with respect to the axial direction, are designed in such a way that relative rotation along the circumferential direction between these surfaces is as frictionless and wear-free as possible. The support element is arranged on the differential basket via an interference/press fit and is connected to it in a rotationally fixed manner. The bevel gear is then arranged to rotate relative to the support element. In an alternative example, the support element can also be designed for rotation relative to the bevel gear.

The bevel gear is supported via the support element by the contact surface of the differential basket. In this case, the bevel gear, with a cylindrically designed support surface (the counter surface) of the second outer circumferential surface of the bevel gear, is supported by the support element (or by the contact surface of the support element) with respect to the radial direction.

The section of the bevel gear (formed as an inner plate carrier) is arranged along the rotary axis between the bevel teeth and the contact surface. The actuating device actuates the plates through the support element. For this purpose, for example, openings extending along the axial direction can be provided in the support element, through which actuating elements of the actuating device extend.

The contact surface of the differential basket and/or the support element is cylindrical.

The contact surface of the differential basket is arranged in a radial direction outside a maximal extension (e.g., radius) of the bevel gear, wherein the maximal extension is the greatest extension of the bevel gear with respect to the radial direction. This allows the bevel gear to be inserted into the differential basket along the axial direction for assembly of the differential gear.

The first outer circumferential surface and the inner circumferential surface of the bevel gear form an overlap area along the rotary axis with two overlap area portions arranged adjacent to each other along the rotary axis, wherein at least one channel is formed in the bevel gear in a first overlap area portion extending from the inner circumferential surface into the section of the second outer circumferential surface. In the first overlap area portion, a plurality of channels are arranged, which are offset from each other along the axial direction and/or along the circumferential direction.

The at least one channel serves to supply a fluid towards the clutch. The fluid is used for cooling the clutch.

The positive connection between the output shaft and the bevel gear, e.g., a splined connection, is arranged in a second overlap area portion.

The first overlap area portion has a larger diameter than the second overlap area portion.

The first overlap area portion is used to guide the fluid along the first output shaft towards the at least one channel. For this purpose, a free space between the output shaft and the inner circumferential surface of the bevel gear is provided. However, this free space reduces the area for supporting the bevel gear with respect to the radial direction. To compensate for the this reduced support in the area of the first overlap area portion, support is provided by the contact surface of the differential basket.

Of the output shafts, only the first output shaft is connectable to the differential basket via a clutch. The second output shaft with the bevel gear connected thereto is arranged in the differential basket without a clutch. The second output shaft is therefore not lockable with respect to the differential basket itself.

The differential gear has two output shafts, whereby only one output shaft can be connected to the differential basket via a clutch in a torque-transmitting manner. The differential gear thus has only one clutch, whereby the two output shafts are coupled to each other via the bevel gear differential gear. The differential basket forms a drive shaft via which the differential gear is connected to a drive unit.

A drive arrangement for a motor vehicle can include a drive unit and the differential gear described herein. The differential gear is provided for transmitting a torque from the drive unit to two wheels of an axle, wherein the torque of the drive unit can be introduced into the differential gear via the differential basket and can be transmitted to a respective wheel via each output shaft.

The differential basket of the differential gear is designed as a drive shaft via which the differential gear can be connected or is connected to a drive unit.

The explanations regarding the differential gear apply equally to the drive arrangement and vice versa.

Furthermore, a motor vehicle is proposed which has at least one above-mentioned drive arrangement and a plurality of wheels, the differential gear being arranged on a rear axle of the motor vehicle.

The use of indefinite articles ("a", "an"), in particular in the claims and the description reproducing them, is to be understood as such and not as a numeral. Terms or components introduced accordingly are thus to be understood as being present at least once and, in particular, may be present several times.

It should be noted that the number words used here ("first", "second", etc.) primarily (only) serve to distinguish between several similar objects, variables, or processes, i.e., they do not necessarily specify a dependency and/or sequence of these objects, variables, or processes in relation to one another. If a dependency and/or sequence is required, this is explicitly stated here, or it is self-evident to the person skilled in the art when studying the described configurations. Insofar as a component may occur several times ("at least one"), the description of one of these components may apply equally to all or part of the majority of these components, but this is not mandatory.

BRIEF SUMMARY OF THE DRAWINGS

The disclosure is explained in more detail below with reference to the accompanying figures. It should be noted that the invention is not to be limited by the design examples given. In particular, unless explicitly stated otherwise, it is also possible to extract partial aspects of the features explained in the figures and combine them with other features and findings from the present description. It should be noted that the figures and the size relationships shown are only schematic.

DESCRIPTION

Figure 1:
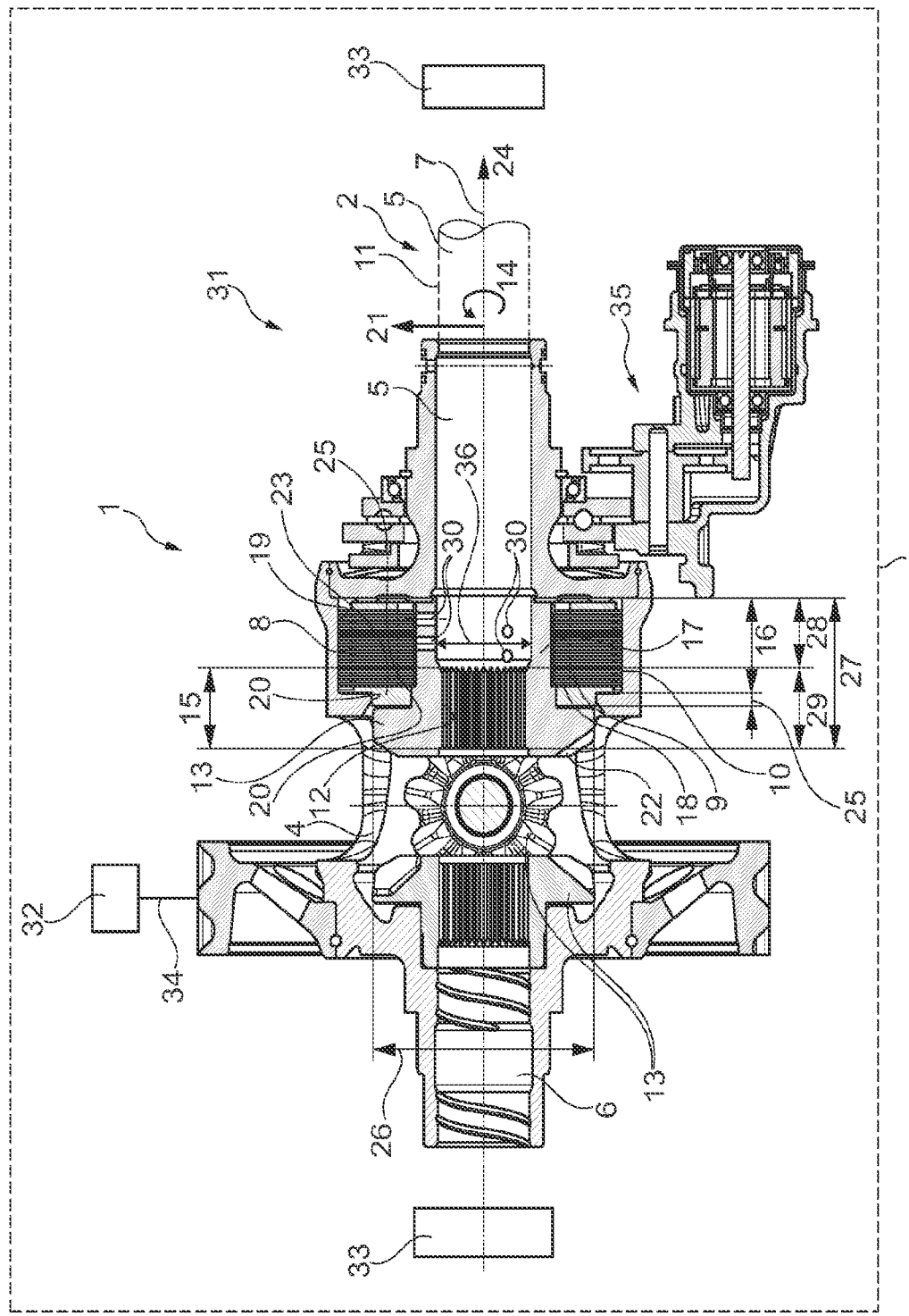
FIG. 1: shows a motor vehicle with a drive arrangement and a differential gear shown in a side view in section.
Figure 2:
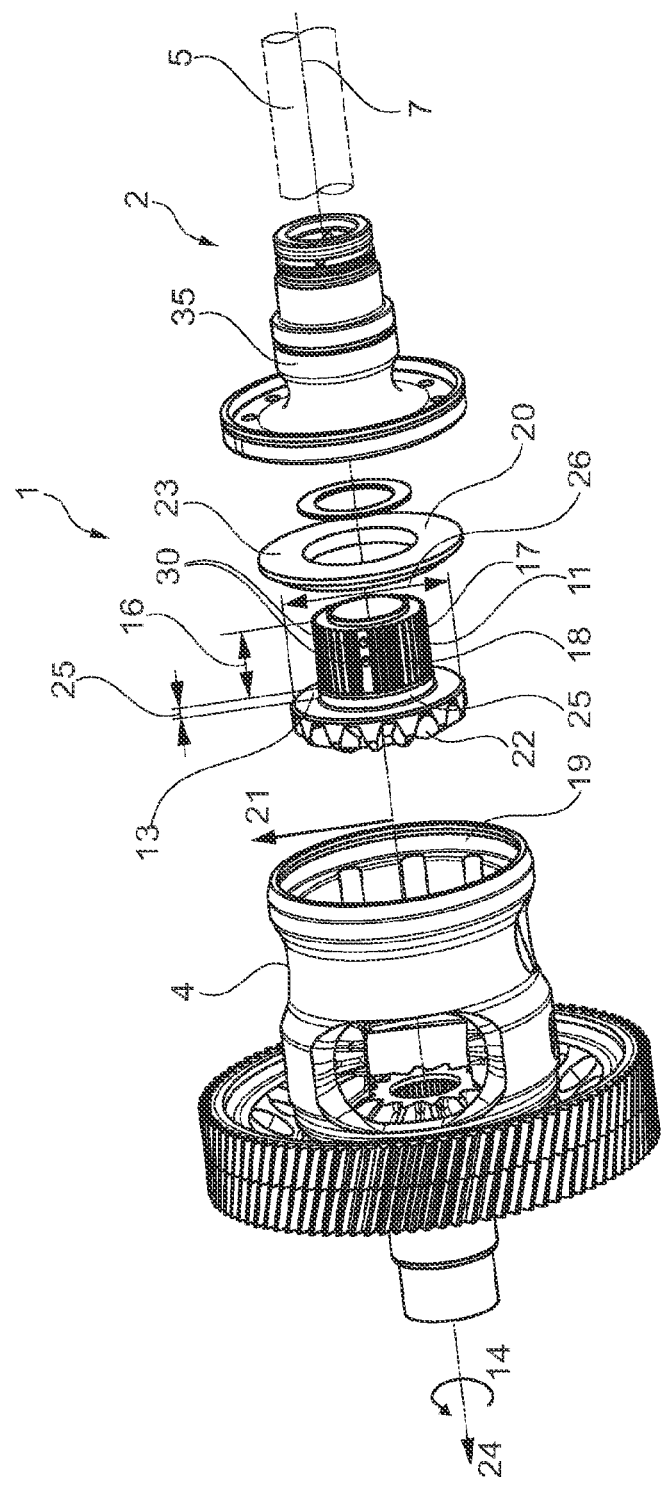
FIG. 2: shows a part of the differential gear according to FIG. 1 in an exploded view in perspective.
Figure 3:
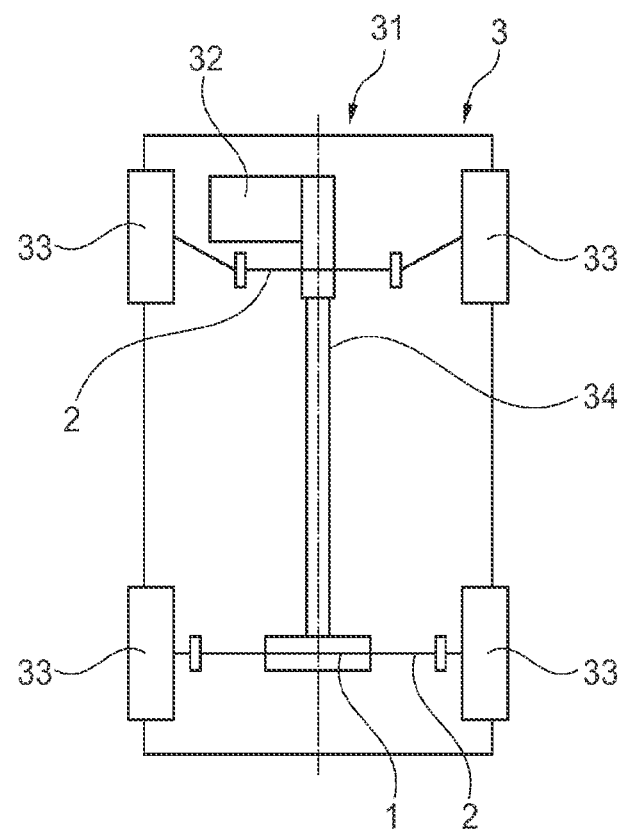
FIG. 3: shows a motor vehicle with a drive arrangement in a plan view.

FIG. 1 shows a motor vehicle 3 with a drive arrangement 31 and a differential gear 1 shown in a side view in section. FIG. 2 shows a part of the differential gear 1 according to FIG. 1 in an exploded view in perspective. FIGS. 1 to 3 are described together below.

The motor vehicle 3 has a drive arrangement 31 and a plurality of wheels 33. The drive arrangement 31 comprises the drive unit 32 and a differential gear 1. The differential gear 1 is provided for transmitting a torque from the drive unit 32 to two wheels 33 of an axle 2. The torque of the drive unit 32 can be introduced into the differential gear 1 via a drive shaft 34 and via the differential basket 4 and can be passed on to a respective wheel 33 via each output shaft 5, 6. The differential gear 1 is arranged e.g., on a rear axle 2 of the motor vehicle 3.

The differential gear 1 has two output shafts 5, 6, whereby only the first output shaft 5 can be connected to the differential basket 4 via a multi-plate clutch 8 so as to transmit torque. The differential gear 1 thus has only one multi-plate clutch 8, with the two output shafts 5, 6 being coupled to one another via the bevel gear differential gear 1. The differential basket 4 forms a drive shaft 34 or is connected to a (further) drive shaft 34, via which the differential gear 1 is connected to a drive unit 32.

The differential gear 1 comprises a differential basket 4 and two output shafts 5, 6 with a common rotary axis 7, as well as a multi-plate clutch 8 with a plurality of inner plates 9 and a plurality of outer plates 10 for the shiftable connection of a first output shaft 5 with the differential basket 4. The first output shaft 5 extends along the rotary axis 7 and forms a positive connection 15 with the bevel gear 13 at least with respect to a circumferential direction 14 via a first outer circumferential surface 11 of the first output shaft 5 and an inner circumferential surface 12 of the bevel gear 13. A section 16 of a second outer circumferential surface 17 of the bevel gear 13 is designed as an inner plate carrier 18 and the differential basket 4 as an outer plate carrier 19. The bevel gear 13 is supported by the differential basket 4 via a contact surface 20 of the differential basket 4 at least with respect to a radial direction 21.

The support is provided by a support element 23 contacting the contact surface 20. The support element 23 is arranged in the radial direction 21 between bevel gear 13 and differential basket 4. The bevel gear 13 contacts the contact surface 20 on the support element 23 via a counter surface. The support element 23 contacts the contact surface 20 on the differential basket 4 via a counter surface. The support element 23 is connected to the differential basket 4 via an interference/press fit in a rotationally fixed manner.

The contact via the contact surface 20 (that on the differential basket 4 and that on the support element 23) enables a connection between the differential basket 4 and the bevel gear 13 that can be rotated (at least largely) without friction relative to the circumferential direction 14. This means that the bevel gear 13 can be rotated relative to the differential basket 4 during operation of the differential gear 1 almost without wear.

The support between differential basket 4 and bevel gear 13 is provided by contacting cylindrical surfaces 20, 25, which together enable the rotatable connection and thereby the support with respect to the radial direction 21. The cylindrical surfaces 20, 25 extend parallel to the rotary axis 7. The cylindrical surfaces 20, 25 are provided on bevel gear 13 and differential basket 4 as well as additionally on the additional support element 23.

The multi-plate clutch 8 can be actuated via an actuating device 35. The actuating device 35 is arranged on the first drive shaft 5 and along the rotary axis 7 next to the multi-plate clutch 8, so that the multi-plate clutch 8 is arranged between the actuating device 35 and the bevel gear 13. Via the actuating device 35, the plates 9, 10 can be displaced along the rotary axis 7 and form an adjustable frictional connection with each other.

The actuating device 35 comprises two expanding discs which are supported via balls with respect to the axial direction 24. Rotation of the expansion discs relative to each other in the circumferential direction 14 results in a change in the position of one expansion disc in the axial direction 24, as the balls are arranged on ramps. The expansion discs are both arranged on the first output shaft 5, whereby the actuating forces are absorbed on one side by one disc secured on the first output shaft 5 with respect to the axial direction 24 and on the other side by the differential basket 4.

The output shafts 5, 6 each extend towards the differential basket 4 and are each positively connected there to a bevel gear 13 at least with respect to the circumferential direction 14. The output shafts 5, 6 are arranged coaxially to each other so that the differential basket 4 and the output shafts 5, 6 have a common rotary axis 7. The bevel gears 13 together with the output shafts 5, 6 are rotatably arranged in the differential basket 4. Within the differential basket 4, the output shafts 5, 6 or their bevel gears 13 are coupled to each other via further toothed wheels or bevel gears 13.

The first output shaft 5 extends along the rotary axis 7 and, via a first outer circumferential surface 11 of the first output shaft 5 and an inner circumferential surface 12 of a bevel gear 13, forms a positive connection 15 with the bevel gear 13 at least with respect to a circumferential direction 14 via a splined connection. A section 16 of a second outer circumferential surface 17 of the bevel gear 13 is designed as an inner plate carrier 18 and the differential basket 4 as an outer plate carrier 19. The inner plates 9 are positively connected to the inner plate carrier 18 with respect to the circumferential direction 14. The outer plates 10 are positively connected to the outer plate carrier 19 with respect to the circumferential direction 14. Inner plates 9 and outer plates 10 are arranged alternately along the axial direction 24 (which extends along the rotary axis 7). By displacing the plates 9, 10 along the axial direction 24, a frictional connection can be formed between the plates 9, 10 so that the first output shaft 5 can be adjustably coupled to the differential basket 4.

The contact surface 20, the one on the differential basket 4 and the one on the support element 23, is arranged along the rotary axis 7 between a plurality of bevel teeth 22 of the bevel gear 13 and the section 16 of the second outer circumferential surface 17 of the bevel gear 13.

The bevel gear 13 is supported by the contact surface 20 via the support element 23. In this case, the plates 9, 10 are supported by the differential basket 4 via the support element 23 with respect to an axial direction 24 extending along the rotary axis 7. The support element 23 can be connected to the differential basket 4 via an interference/press fit in a rotationally fixed manner. Thus, in some examples, there is no relative rotation between the outer plates 10 and the support element 23. The bevel gear 13, with a cylindrically designed support surface 25 (the counter surface) of the second outer circumferential surface 17 of the bevel gear 13, is supported by the support element 23 (or by the contact surface 20 of the support element 23) with respect to the radial direction 21.

The contact surface 20 of the differential basket 4 is arranged in a radial direction 21 outside a maximal extension 26 of the bevel gear 13, wherein the maximal extension 26 is the greatest extension 26 of the bevel gear 13 with respect to the radial direction 21. This allows the bevel gear 13 to be inserted into the differential basket 4 along the axial direction 24 for assembly of the differential gear 1. With the arrangement of the bevel gear 13, the press fit is formed between the support member 23 and the differential basket 4.

The first outer circumferential surface 11 of the first output shaft 5 and the inner circumferential surface 12 of the bevel gear 13 form an overlap area 27 along the rotary axis 7 with two overlap area portions 28, 29 arranged adjacent to each other along the rotary axis 7, wherein in a first overlap area portion 28 a plurality of channels 30 are formed in the bevel gear 13, which extend from the inner circumferential surface 12 into the section 16 of the second outer circumferential surface 17. A plurality of channels 30 are arranged in the first overlap portion 28, each of which is arranged offset along the axial direction 24 and along the circumferential direction 14.

The channels 30 serve to supply a fluid to the multi-plate clutch 8. The positive connection 15 between the first output shaft 5 and the bevel gear 13, in this case a splined connection, is arranged in the second overlap area portion 29. The first overlap area portion 28 has a larger diameter 36 than the second overlap area portion 29.

The first overlap area portion 28 is used to guide the fluid along the first output shaft 5 towards the channels 30. This provides a free space/clearance between the first output shaft 5 and the inner circumferential surface 12 of the bevel gear 13. However, this free space reduces the area required for supporting the bevel gear 13 with respect to the radial direction 21. To compensate for the reduced support in the area of the first overlap area portion 28, support is provided by the contact surface 20 of the differential basket 4.

LIST OF REFERENCE SIGNS 1 differential gear
2 axle
3 motor vehicle
4 differential basket
5 first output shaft
6 second output shaft
7 rotary axis
8 multi-plate clutch
9 inner plate
10 outer plate
11 first outer circumferential surface
12 inner circumferential surface
13 bevel gear
14 circumferential direction
15 connection
16 section 17 second outer circumferential surface
18 inner plate carrier
19 outer plate carrier
20 contact surface
21 radial direction
22 bevel teeth
23 support element
24 axial direction
25 support surface
26 extension
27 overlap area
28 first overlap area portion
29 second overlap area portion
30 channel
31 drive assembly
32 drive unit
33 wheel
34 drive shaft
35 actuating device
36 diameter

The invention claimed is:

1. A differential gear for transmitting a torque to an axle of a motor vehicle, comprising:
a differential basket;
a bevel gear having inner and outer circumferential surfaces, the bevel gear being supported by a contact surface of the differential basket at least with respect to a radial direction;
first and second output shafts having a common rotary axis, the first output shaft extending along the rotary axis and forming a positive connection with the bevel gear at least with respect to a circumferential direction via an outer circumferential surface of the first output shaft and the inner circumferential surface of the bevel gear; and
a multi-plate clutch for selectively connecting the first output shaft with the differential basket, the multi-plate clutch including an inner plate carried by a section of the outer circumferential surface of the bevel gear and an outer plate carried by the differential basket, wherein the contact surface is arranged along the rotary axis between a plurality of bevel teeth of the bevel gear and the section of the outer circumferential surface of the bevel gear, and wherein the bevel gear is supported by the contact surface via a support element, and the plates are supported by the differential basket via the support element with respect to an axial direction extending along the rotary axis.

2. The differential gear according to claim 1, wherein the support element is rotationally fixed with respect to the differential basket via a press fit.

3. The differential gear according to claim 1, wherein the bevel gear is supported by the contact surface via a support element, and the bevel gear is supported by the support element with respect to the radial direction via a cylindrically formed support surface of the outer circumferential surface of the bevel gear.

4. The differential gear according to claim 3, wherein the cylindrically formed support surface is arranged along the rotary axis between a plurality of bevel teeth and the section of the outer circumferential surface of the bevel gear.

5. The differential gear according to claim 1, wherein the contact surface is cylindrical.

6. The differential gear according to claim 1, wherein the contact surface is arranged in the radial direction outside a maximal extension of the bevel gear in the radial direction.

7. The differential gear according to claim 1, wherein the outer circumferential surface of the first output shaft and the inner circumferential surface of the bevel gear form an overlap area along the rotary axis with first and second overlap area portions arranged adjacent to one another along the rotary axis, at least one channel being formed in the bevel gear in the first overlap area portion, which channel extends from the inner circumferential surface of the bevel gear and through the outer circumferential surface of the bevel gear.

8. The differential gear according to claim 7, wherein the positive connection between the first output shaft and the bevel gear is arranged in the second overlap area portion.

9. The differential gear according to claim 8, wherein the positive connection between the first output shaft and the bevel gear is arranged with a splined connection.

10. The differential gear according to claim 1, wherein only the first output shaft is connected with the differential basket via a multi-plate clutch.

11. A differential gear for transmitting a torque to an axle of a motor vehicle, comprising:
a differential basket;
a bevel gear having inner and outer circumferential surfaces, the bevel gear being supported by a contact surface of the differential basket at least with respect to a radial direction;
first and second output shafts having a common rotary axis, the first output shaft extending along the rotary axis and forming a positive connection with the bevel gear at least with respect to a circumferential direction via an outer circumferential surface of the first output shaft and the inner circumferential surface of the bevel gear; and
a multi-plate clutch for selectively connecting the first output shaft with the differential basket, the multi-plate clutch including an inner plate carried by a section of the outer circumferential surface of the bevel gear and an outer plate carried by the differential basket, wherein the outer circumferential surface of the first output shaft and the inner circumferential surface of the bevel gear form an overlap area along the rotary axis with first and second overlap area portions arranged adjacent to one another along the rotary axis, at least one channel being formed in the bevel gear in the first overlap area portion, which channel extends from the inner circumferential surface of the bevel gear and through the outer circumferential surface of the bevel gear, and wherein the first overlap area portion has a larger diameter than the second overlap area portion providing a free space to guide a fluid towards the at least one channel between the outer circumferential surface of the first output shaft and the inner circumferential surface of the bevel gear.

12. A drive arrangement for a motor vehicle, comprising:
a drive unit and a differential gear for transmitting a torque from the drive unit to two wheels of an axle, the differential gear including:
a differential basket;
a bevel gear having inner and outer circumferential surfaces, the bevel gear being supported by a contact surface of the differential basket at least with respect to a radial direction;
first and second output shafts having a common rotary axis, the first output shaft extending along the rotary axis and forming a positive connection with the bevel gear at least with respect to a circumferential direction via an outer circumferential surface of the first output shaft and the inner circumferential surface of the bevel gear; and a multi-plate clutch for selectively connecting the first output shaft with the differential basket, the multi-plate clutch including an inner plate carried by a section of the outer circumferential surface of the bevel gear and an outer plate carried by the differential basket, wherein the contact surface is arranged along the rotary axis between a plurality of bevel teeth of the bevel gear and the section of the outer circumferential surface of the bevel gear, and wherein the bevel gear is supported by the contact surface via a support element, and the plates are supported by the differential basket via the support element with respect to an axial direction extending along the rotary axis.

13. The drive arrangement according to claim 12, further comprising a clutch actuating device positioned on the first drive shaft and along the rotary axis next to the multi-plate clutch, so that the multi-plate clutch is positioned between the actuating device and the bevel gear.

14. The drive arrangement according to claim 12, wherein the multi-plate clutch includes multiple inner plates and multiple outer plates arranged alternately along the rotary axis.

15. The drive arrangement according to claim 12, wherein the outer circumferential surface of the first output shaft and the inner circumferential surface of the bevel gear form an overlap area along the rotary axis with first and second overlap area portions arranged adjacent to one another along the rotary axis, at least one channel being formed in the bevel gear in the first overlap area portion, which channel extends from the inner circumferential surface of the bevel gear and through the outer circumferential surface of the bevel gear.

16. The drive arrangement according to claim 15, wherein the positive connection between the first output shaft and the bevel gear is arranged in the second overlap area portion.

17. The drive arrangement according to claim 12, wherein only the first output shaft is connected with the differential basket via a multi-plate clutch.

18. A drive arrangement for a motor vehicle, comprising:
a drive unit and a differential gear for transmitting a torque from the drive unit to two wheels of an axle, the differential gear including:
a differential basket;
a bevel gear having inner and outer circumferential surfaces, the bevel gear being supported by a contact surface of the differential basket at least with respect to a radial direction;
first and second output shafts having a common rotary axis, the first output shaft extending along the rotary axis and forming a positive connection with the bevel gear at least with respect to a circumferential direction via an outer circumferential surface of the first output shaft and the inner circumferential surface of the bevel gear; and
a multi-plate clutch for selectively connecting the first output shaft with the differential basket, the multi-plate clutch including an inner plate carried by a section of the outer circumferential surface of the bevel gear and an outer plate carried by the differential basket, wherein the outer circumferential surface of the first output shaft and the inner circumferential surface of the bevel gear form an overlap area along the rotary axis with first and second overlap area portions arranged adjacent to one another along the rotary axis, at least one channel being formed in the bevel gear in the first overlap area portion, which channel extends from the inner circumferential surface of the bevel gear and through the outer circumferential surface of the bevel gear, and wherein the first overlap area portion has a larger diameter than the second overlap area portion providing a free space to guide a fluid towards the at least one channel between the outer circumferential surface of the first output shaft and the inner circumferential surface of the bevel gear.

* * * * *